July 17, 1962
T. A. BUCHHOLD
3,044,309
GYROSCOPE
Filed Feb. 9, 1959
6 Sheets-Sheet 1
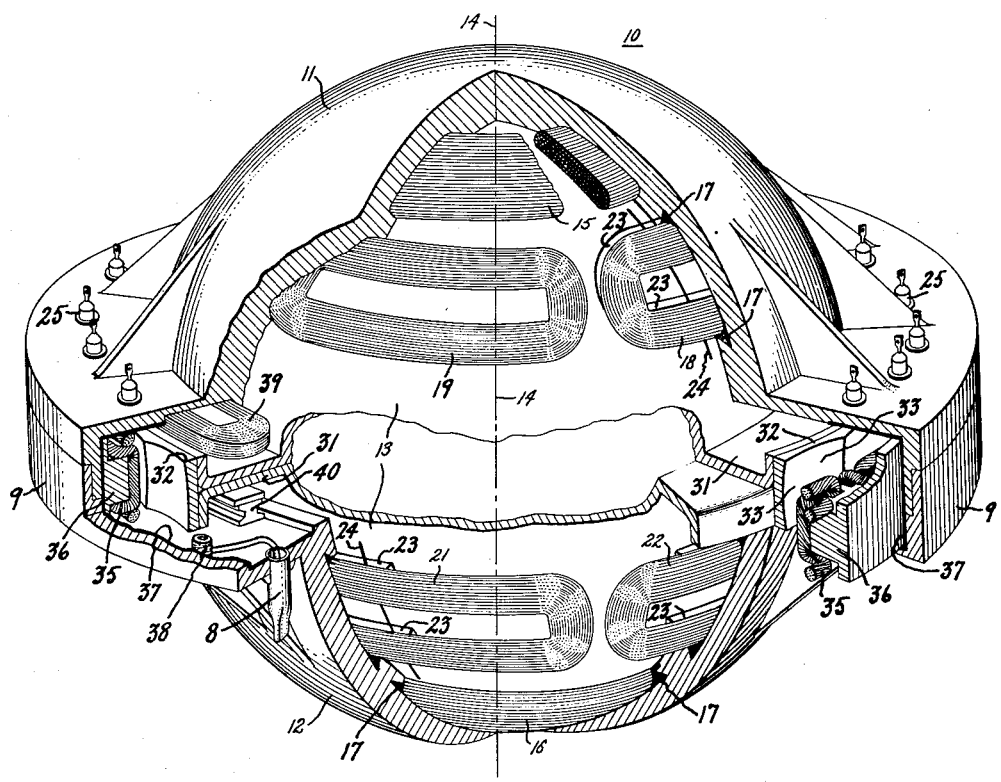
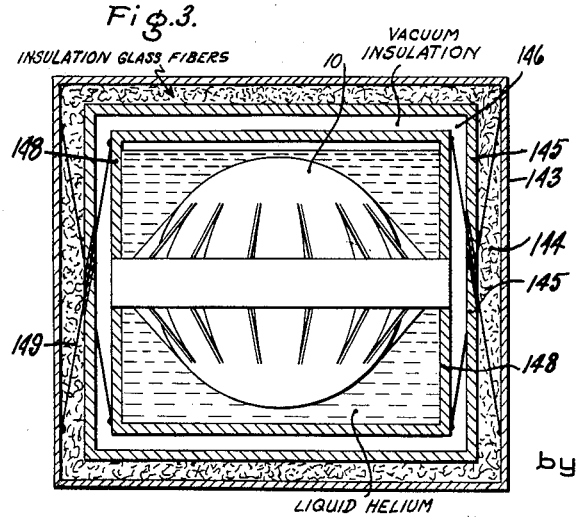
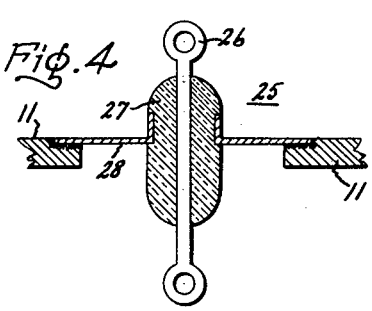
Inventor:
Theodor A. Buchhold,
by Charles W. Helzer
His Attorney.

July 17, 1962 T. A. BUCHHOLD 3,044,309
GYROSCOPE
Filed Feb. 9, 1959 6 Sheets-Sheet 2

Inventor:
Theodor A. Buchhold,
by Charles W. Helfer
His Attorney.

July 17, 1962 — T. A. BUCHHOLD — 3,044,309
GYROSCOPE
Filed Feb. 9, 1959 — 6 Sheets-Sheet 5

Inventor
Theodor A. Buchhold
by Charles W. Hezer
His Attorney

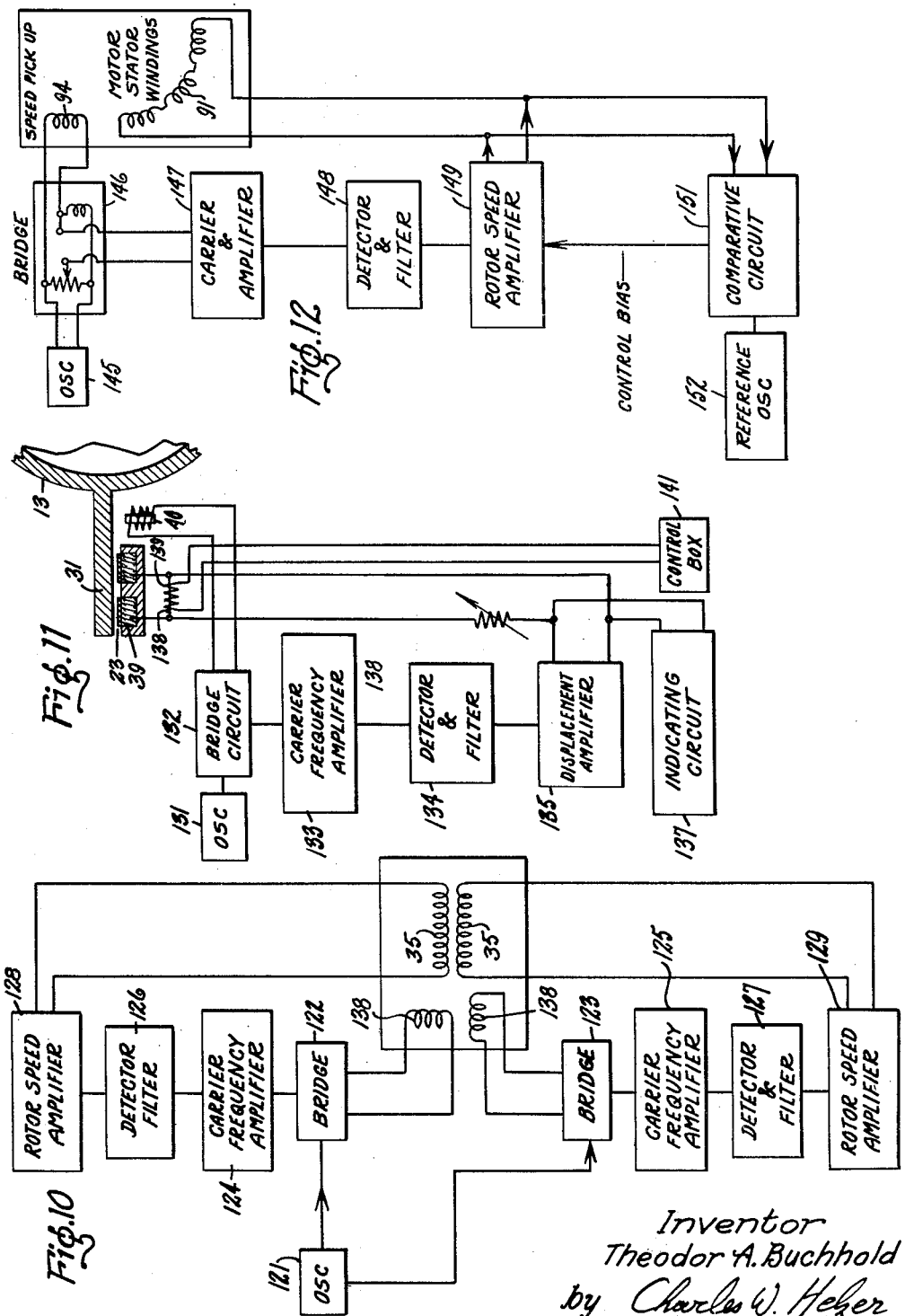

United States Patent Office 3,044,309
Patented July 17, 1962

1

3,044,309
GYROSCOPE
Theodor A. Buchhold, Schenectady, N.Y., assignor to General Electric Company, a corporation of New York
Filed Feb. 9, 1959, Ser. No. 792,195
18 Claims. (Cl. 74—5)

This invention generally relates to improvements in gyroscopic devices finding particular utility in tracking, navigation, and control systems.

One of the more serious shortcomings of presently available navigation and control systems for aircraft, missiles, and other vehicles is attributable to the inherent limitations of the gyroscopic sensing devices which originate what might be termed the "intelligence" or reference signals used in navigation systems. If such reference information various in any perceptible degree, the intelligence fed into the system is likewise in error; and if such reference information randomly varies with time, the resulting error can become considerable. Presently known gyroscopic devices are subject to many such random error variations with time, commonly termed "drift," resulting from friction in the precession bearings, uneven wear especially of the spin bearings, creep errors, changes in dimensions of the elements with temperature variation of the environment, and others. These "drift" errors become prohibitive, for example, in applications such as in navigational systems for intercontinental and interplanetary flights involving long time of flight periods.

To overcome such errors, reference information may be obtained from time to time from independent sources, and the gyro may be corrected. Additionally, elaborate temperature compensating devices have been advised to minimize the effect of temperature change, and considerable effort has been expended in the area of minimizing the friction of the precession bearings by means of suspending the housing of the gyro in a buoyant fluid and by using jeweled and other special bearing materials. Despite all these efforts, however, uncertainties due to friction of the spin bearings, and the like are still present and the randomness of drift produced in the gyro by these uncertainties does not allow compensation for long periods of time. Accordingly, despite all of the improvements in gyro construction, the "drift" errors of known gyros are still too large in applications where the time of travel of the vehicle using the gyro is great.

To overcome these disadvantages in accordance with the present invention, there is provided a gyroscopic device in which substantially all random errors associated with friction, wear, creep, temperature variations, and chemical interactions are eliminated to provide an accuracy far greater than is obtainable with an known gyroscopic device. Specifically, there is provided a gyroscope of super-conductive material which is continuously maintained at a low temperature in the neighborhood of 4 degrees Kelvin, and in which the mechanical bearings for both spin and precession axes are completely eliminated. Because this gyro is fabricated from superconducting materials, there is very little error introduced into its reading due to long time deformation of the parts of the gyro under load, the dimensional changes are accordingly quite low, the tensile strength of the parts of the gyro are higher, and its parts are chemically inactive. Furthermore, the gyro possesses lossless electrical drive mechanisms, pickoffs, sensing devices, and torque devices, all of which present no electrical losses and no heating. As a result there is provided a gyroscopic device having a substantially constant calibration over long periods of time and possessing considerable greater accuracy than any other known device. It is anticipated that such a gyro can be used in conjunction with a rough position

2 device driven by known arrangements, to provide a system having an accuracy which heretofore has been unattainable.

It is accordingly one object of this present invention to provide a gyroscopic device having "drift" errors considerably less than any known gyroscopic construction.

Another object is to provide an extremely accurate, stable, and shock resistant gyroscopic device.

A still further object is to provide a gyroscope that maintains constant calibration for long periods of time.

A still further object is to provide such a device having far greater accuracy and sensitivity than any known gyroscopic device.

Other objects and many attendant advantages of the present invention will be more readily comprehended to those skilled in the art upon a detailed consideration of the following specification taken with the accompanying drawings wherein:

FIGURE 1 is a perspective view, partly in section, depicting one embodiment of a gyroscope employing the present invention;

FIGURE 3 is a section view generally illustrating the mounting and cooling of a superconducting gyroscope;

FIGURE 4 is a sectional view illustrating the construction of an insulated supply terminal used on the gyroscope of FIGURE 1;

FIGURE 9 is a cross-sectional view of the rotor of the gyro shown in FIGURE 6 and illustrates the construction of the armature of the gyro;

FIGURE 10 is a functional block diagram of a rotor speed control circuit used with the gyros of FIGURES 1 and 2;

FIGURE 11 is a functional block diagram of a spin axis displacement measuring circuit used with the gyros of FIGURES 1 and 2; and FIGURE 12 is a functional block diagram of a rotor speed control circuit used with the gyro of FIGURE 6.

Figure 2:
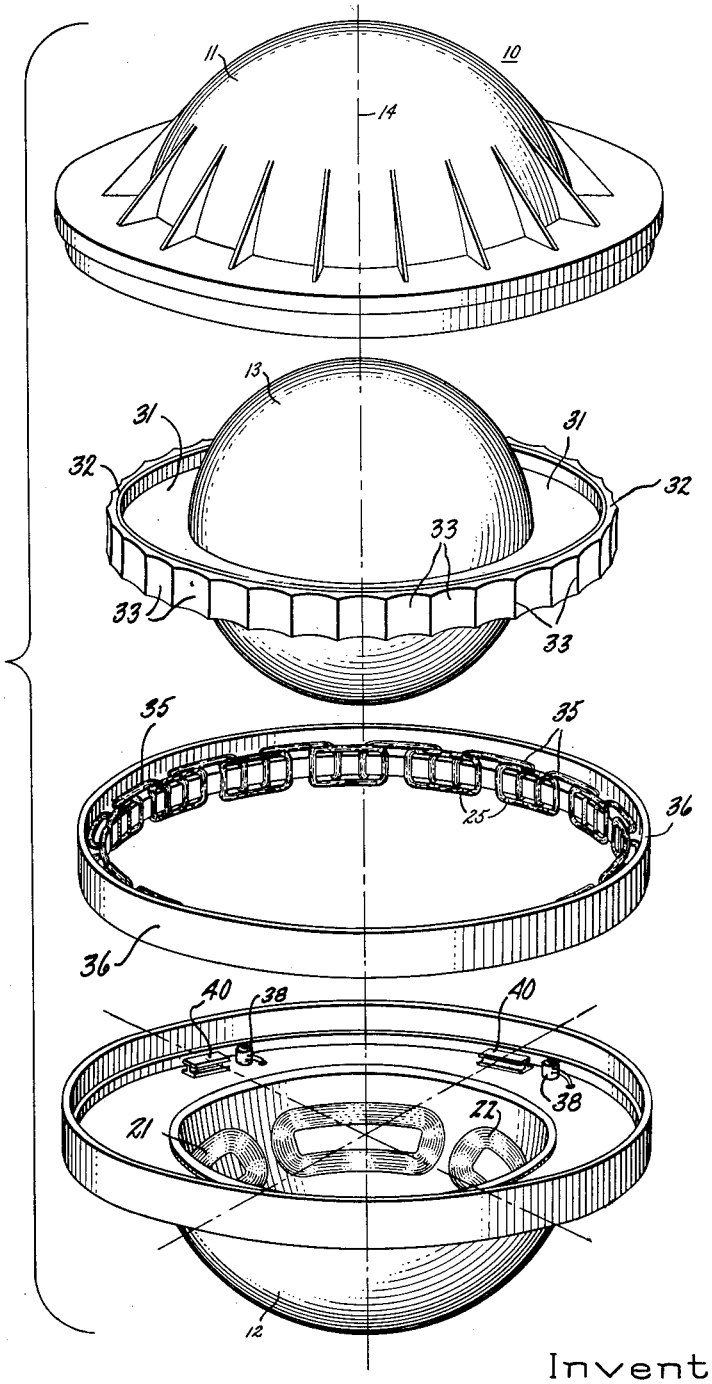
FIGURE 2 is an exploded view of the elements of FIGURE 1.

A new and improved superconductive gyroscope constructed in accordance with the invention is shown in FIGURE 1 of the drawings. This gyroscope includes an outer housing 10 formed from an upper hemisphere 11 and a lower hemisphere 12 which are fabricated from a non-superconducting metal such as iron. A rotor 13 fabricated from superconducting material, is rotatably supported within housing 10 by magnetic bearing means to be described more fully hereinafter. This magnetic bearing means stably supports rotor 13 within housing 10 completely out of contact with any mechanical support, and without incurring any mechanical losses due to friction, eddy currents, normally associated with known bearing construction.

As is discussed in greater detail in copending application Serial No. 709,118, "Bearing Construction," T. A. Buchhold, inventor, assigned to the General Electric Company, certain pure metals or alloys thereof become electrically superconductive when the temperature is lowered to a point close to absolute zero. While in this superconductive condition such materials possess infinite electrical conductivity which prevents the penetration of a magnetic flux therein. Consequently, by directing a magnetic field against such a magnetic insulator, its inability to penetrate the member provides a unique magnetic pressure force which may be used to suspend the member. Such a floating suspension not only eliminates mechanical type friction associated with sliding surfaces, but also electrical losses since the lack of electrical resistance eliminates any heating loss that may result from circulating electrical currents. The nature and effect of this unique bearing force differs considerably from the usual bearing forces, and its use in conjunction with a novel drive means, precession pickup device, torquers and the like, is believed to provide an entirely new and greatly improved gyroscope.

In accordance with the present invention, the rotor 13, which is fabricated from a superconductive material, is rotatably supported within the housing 10 by means of a pair of vertical stabilizing bearing coils 15 and 16, and two sets each made up of four coils of lateral stabilizing bearing coils partially shown at 18, 19, 21 and 22. The vertical stabilizing bearing coil 15 is mounted in the upper hemisphere 11, and the bearing coil 16 is mounted in the lower hemisphere 12, as shown in FIGURE 1, and since the construction of each is identical, only the manner in which bearing coil 15 is fabricated will be described in detail. The vertical bearing coil 15 is formed from approximately 1000 turns of 5 mil diameter formex insulated niobium wire wound in the form of a continuous circle, and results in a bearing coil having about one inch mean diameter. The bearing coil itself is supported in a groove shaped or otherwise formed into the upper hemisphere 11, and is retained in this groove by means of a potting compound which is poured around the turns of the coil and coacts upon setting with the dovetail formed in the edge of the groove to retain the coil in position. A suitable potting compound for use in this manner is manufactured and sold by the American Cyanamid Company under the trade name "Laminac" Number 4116, and is essentially a polyester resin. The lower vertical bearing coil 16 is fabricated in an identical manner to the upper coil 15, and the two coils are connected together in parallel circuit relationship to a source of direct current through a suitable control device such as a rheostat. Upon being thus energized, the coils 15 and 16 are capable of providing a supporting force in the neighborhood of three to five hundred grams per square centimeter.

In order to stabilize the rotor 13 in a lateral direction, there is provided a set of four lateral stabilizing bearing coils in each of the hemispheres 11 and 12. Two of the lateral stabilizing coils in the upper hemisphere 11 are shown at 18 and 19, and two of the lateral stabilizing coils in the lower hemisphere 12 are shown at 21 and 22. Each of the lateral stabilizing bearing coils 18, 19, 21, 22, etc., is formed from approximately 500 turns of 5 mil diameter niobium wire which may be formex insulated if desired. Fabrication in this manner results in a bearing coil which is generally rectangular in shape, and approximately one-half inch wide and one and one-quarter inches long. The lateral stabilizing coils are supported within the two hemispheres 11 and 12 in a manner similar to that described with relation to the vertical stabilizing coils 15 and 16. While the individual lateral stabilizing coils are not capable of producing as strong a magnetic pressure field for stabilizing the rotor 13 in a lateral direction as the vertical stabilizing coils 15 and 16, since there is a set of four such coils in each hemisphere which are connected in parallel circuit relationship to a source of direct current through a suitable control device such as a rheostat, the supporting field produced by such an arrangement has been determined to be more than adequate to support rotor 13 in a lateral direction. It should be noted that the fabrication of the bearing coils can be easily altered from that described, and still result in a satisfactory structure. However, it is essential that the bearing coils be formed from a superconductive material in order to take full advantage of the unique characteristics of such a material.

While it is possible for the surface of all the bearing coils confronting the rotor 13 to be exposed directly to the surface of the rotor, it is possible that the confronting surfaces of the bearing coils be covered by a superconductive plate such as the plate 23 shown in FIGURE 1. The plate 23 has the same general configuration as the bearing coils which they cover and may be secured over the faces of the coils by staking, welding or other suitable means of attachment. Each of the magnetic bearing coils 15, 16, 18, 19, 21, 22, etc., has its face confronting the rotor 13 covered by a superconductive plate such as that shown at 23, and a heating wire indicated at 24, extends across each such plate for trapping into the superconducting plate 23 the magnetic flux developed by the magnetic bearing coils in the manner described with relation to FIGURES 9–13 of the above identified copending patent application. The technique for freezing the magnetic flux developed by the bearing coils into its associated superconductive plate 23 is described more fully in the above identified copending application. However, it might be well to briefly point out that by properly timed operation of the heating wire 24 after buildup of the flux in each of the magnetic coils 15, 16, etc., a magnetic flux may be trapped between the plate 23 by de-energizing the heating wire and allowing the plate to again become superconductive. As a consequence of this technique of operation, it is thereafter possible to de-energize the magnetic bearing coils with no reduction in the magnetic pressure force developed by the flux frozen around the superconductive bearing plates 23. Superconductive lead wires for supplying electric current to the magnetic bearing coils 15, 16, 18, 19, 21 and 22, etc., initially may be run through grooves (not shown) cut in the hemispheres 11 and 12, and connected to supply terminals 25. Such superconductive lead wires would of course be properly shielded by split superconductive outer conduits or the like which surround them.

The construction of the supply terminal 25 is illustrated in FIGURE 4 of the drawings. Each terminal comprises a superconductive lead wire 26 embedded in an insulating body such as sapphire or alumina indicated at 27. The insulating body 27 is supported by a superconductive concentrically shaped supporting member 28 that is directly welded or otherwise secured to the surface of the hemisphere 11. All of the connections to the superconductor concentric ring must provide a vacuum-tight seal in order that the interior of housing 10 be evacuated. Superconductive electrical conductors (not shown) which are connected to the supply terminals 25 are then run out through suitable heat sinks and heat traps, to the control panel for the gyro which is usually maintained at normal room temperature. The outer housing 10 however is supported in a liquid refrigerant which maintains the temperature of the housing 10 together with rotor 13, the bearing coils, and remaining structure within the housing at approximately 4 degrees Kelvin (−273° F.).

The details of construction of the rotor 13 are best shown in FIGURE 2 of the drawings. The rotor 13 is formed from two hemispheres each fabricated out of a suitable superconducting material by drawing or otherwise. There are 21 known different metallic elements which exhibit superconducting characteristics, as well as a large number of alloys which become superconducting at various temperatures. For example, hafnium becomes superconducting at temperatures as low as .35 degree Kelvin while niobium becomes superconducting at 8 degrees Kelvin. Some alloys have been found to possess even higher superconductive temperatures such as niobium nitride, which becomes superconducting at about 15.5 degrees Kelvin. Some of the known superconducting materials are Al, Zn, Ga, Cd, In, Sn, Hg, Tl, Tb, Ru, Re, Os, U, Th, Hf, Ta, Zr, Nb, B, Ti, and La, Although all of these elements are known to be superconducting, because of other characteristics, some are preferred over others. For the gyro in question, niobium has proven to be most satisfactory, and hence in the specific embodiment in question, the rotor halfs were fabricated from niobium. As best seen in FIGURE 1 each of the hemispheres of the rotor 13 has an outstanding rim portion 31 with an upturned end to which it is tack welded, brazed or otherwise secured to an armature ring 32. The armature ring 32 is fabricated from a superconducting material, preferably niobium, and surrounds the equator portion of the resulting spherical rotor 13 formed by connecting together the two hemispheres. The armature ring 32 also has a plurality of depressions 33 formed therein in a regular pattern to provide discontinuities on its outer surface. In the particular embodiment of the invention in question, the resulting rotor 13 may be approximately two inches in diameter, has a wall thickness of .04 inch, and weighs about 110 grams. For a rotor of this size the rim portion 31 may be as large as 3/8 inch wide while the armature ring 32 may have a dimension in the up and down direction ranging from 1/10 inch up to 1/2 inch. Prior to assemblying the rotor 13 within outer housing 10, the rotor should be carefully balanced using conventional floatation techniques to discover areas where imbalance occurs. Upon assemblying the rotor 12 within the housing member 10, assuming the magnetic bearing coils to be energized so that the rotor is properly centered, there should be a clearance of approximately 12,000th of an inch (.012") between the rotor and the outer housing.

It should be noted that the sizes, weights and clearances listed above are exemplary only, and that fabrication of gyroscopes in accordance with the teachings of the present invention are no restricted to these parameters. In practice, it should also be noted that the rotor 13 which is hollow is intended to operate in an evacuated space. For this reason, it is desirable that vent holes (not shown) be provided in the rotor 13 to equalize the pressure on both sides of its surface.

The rotor 13 is made to rotate about its spin axis 14 by a rotating magnetic field that acts against the upright portions 33 of the armature ring 32. This rotating magnetic field is developed by a two phase stator winding 35 secured within the housing 10 and surrounding the armature ring 32 in confronting fashion. This two-phase stator winding is formed from approximately 55 turns of 10 mil diameter formex coated niobium wire or some other suitable superconducting wire which is wound in a conventional two-phase saddle wound manner with one phase displaced from the other a distance approximately equal to one-half the space between the indentation 33 formed in the armature ring 32. One phase winding is then excited by an electric signal which is displaced 90 electrical degrees from the signal exciting the other phase winding. The phase windings are formed in a conventional saddle wound manner so as to have a vertical rise that confronts the armature ring 32 approximately equal to the up and down dimension of the armature ring 32, and the current flowing in one field coil is opposite in direction to the current flowing in the adjacent coil. The stator windings 35 are mounted on a circular ring 36 which may be formed from a cloth laminated phenolic such as Textolite or other nonconductive material, and are magnetically insulated from the outer housing 11 by a magnetic superconducting shield 37, best seen in FIGURE 1 of the drawings. This magnetic shield is fitted in the flange portion or trough and formed in the outer housing 10, and may comprise a foil of superconducting material, such as niobium foil, secured to the inside surfaces of the flange portion 9 to confine the magnetic field produce by the stator field windings 35 to the neighborhood of the upright indented portions 33 of armature ring 32. In this manner, no leakage of the field flux produced by the stator windings 35 will occur to the housing 11, but will be confined to the area of the armature ring to act on it. To hold the stator windings 35 in position on the mounting ring 36, it may prove desirable to provide dovetail openings in the mounting ring 36 so that a potting compound such as Laminac may be poured around the winding 35 and coact with the dovetail openings to rigidly hold the windings 35 in position on the stator. Upon energizing the stator field winding 35, the magnetic field produced by the windings will act against the outstanding up and down ridges formed on the armature ring 32 by the identations 33 to thereby cause the armature ring 32, and hence rotor 13, to rotate about its spin axis 14 in the manner described in application Serial No. 757,836, originally filed August 28, 1958, entitled "Motor Construction," T. A. Buchhold, inventor, assigned to the General Electric Company and refiled March 20, 1959, now Patent No. 3,005,117. This rotation is of course caused by the rotating magnetic field produced by the two phase stator winding 35 so that rotor 13 is caused to rotate synchronously with it. With stator field windings constructed in the manner described, it is possible to excite the field windings with a field current of approximately 2 amperes to produce a very strong rotating magnetic field that is capable of synchronously driving the rotor 13 up to speeds of 40,000 to 50,000 r.p.m. It is of course possible to obtain either higher or lower speeds depending primarily upon the size of the rotor used and the frequency of the signals used to excite field winding 35.

In order to measure the speed of revolution of the rotor 13 about its spin axis 14—14, and to derive a useful indication of the rotor speed for control purposes, a pair of speed pickup coils 38 are provided, as shown in FIGURES 1 and 2 of the drawings. The speed pickup coils 38 are conventional multiturn coils which are energized with a high frequency current, and which coact with the discontinuities formed on the armature ring 32 by the indentations 33. The pickup coils are mounted approximately 90 degrees apart on housing sphere 12 under the indented edge of armature ring 32. In operation, the discontinuities on armature ring 32 caused by indentations 33 will modulate the gap in the space between the high frequency pickup coils 38 and the rim portion 31 so as to impose a modulation on the signal energizing the pickup coil 38. This modulation may then be demodulated and used as an indication of the speed of revolution of rotor 13. The demodulation signal may also be used to control the frequency of the signal exciting the stator winding 35 so as to synchronize the speed of rotor 13 with the frequency of the energizing signal supplied to the stator winding 35.

The control circuit for developing and using the electric signal representative of the speed of revolution of rotor 13 is shown in FIGURE 10 of the drawings. This circuit includes a conventional high frequency oscillator 121 having its ouput supplied in tandem to a pair of bridge circuits 122 and 123. The bridge circuits 122 and 123 each include one of the high frequency pickup coils 38 in one of the arms thereof with the two pickup coils 38 being displaced with respect to each other in a manner so that the electric signals derived thereby are electrically 90 degrees out of phase. As a consequence of this arrangement, the output signal from the bridge circuit 123 will be 90 degrees out of phase with respect to the output signal developed by bridge circuit 122. The output signals from these two bridge circuits are supplied to conventional carrier frequency amplifiers 124 and 125, demodulator circuits 126 and 127, and to audio-frequency rotor speed amplifiers 128 and 129. Because all of these elements of the circuit operate at normal room temperature, they are of conventional construction and a detailed description thereof is not believed necessary. The output signal developed by the audio-frequency rotor speed amplifier 128 is supplied to one phase of the stator field windings 35, and the output from the audio-frequency rotor speed amplifier 129 is supplied to the remaining phase of the stator field windings 35. The output of the rotor speed amplifiers 128 and 129 may also be supplied to a suitable indicating instrument to indicate the speed at which the rotor 13 is running. By this construction, synchronization between the speed of rotor 13 and the energizing signal supplied to stator field windings 35, is obtained.

Upon initially placing the gyroscope in operation, it is unlikely that the spin axis 14—14 of rotor 13 will be properly aligned with the vertical axis of outer housing 10 due to differences in the pressure forces produced by the several magnetic bearing coils. In order to overcome this misalignment, a plurality of torquer coils, one of which is shown at 39 in FIGURE 1, is provided on the undersurface of the upper hemisphere 11 in confronting relation with the upper surface of rim portion 31 of rotor 13. There are four such torquer coils 39 located in a plane normal to the spin axis 14 equally spaced in quadrants around the perimeter of the flange or trough portion 9 of the outer housing 10. The torquer coils 39 are fabricated in much the same manner as the bearing coils in that it is their purpose to develop a magnetic pressure that acts against rim 31 to cause the rotor 13 to be tilted relative to the vertical axis of housing 10. For this purpose the torquer coils 39 may be secured on either side of the rim portion 31 of rotor 13 onto either the lower or upper housing 11 or 12 in much the same manner that the bearing coils were secured thereto. In order not to develop undesired circulating current which might have a deleterious effect, it is anticipated that the torquer coils 39 will be disposed over the outer rim portion 31 so as not to be influenced by the marker track 38a appearing thereon.

Assuming the gyroscope to be in operation with rotor 13 rotating at a desired speed, and with the spin axis 14—14 thereof aligned with the vertical axis of housing 10, it will thereafter be desirable to measure any displacement of the spin axis with respect to the vertical axis of the housing to derive indications of any change in attitude, direction, etc. For this purpose, a displacement pickup head 40 is provided on the flange portion 9 of the lower hemisphere 12. The pickup head 40 may comprise either an inductive or capacitive pickup head, and there are four such displacement pickup heads located in each quadrant of a plane normal to the vertical axis of housing 10 as shown in FIGURE 2 of the drawings. The four displacement pickup heads 40 may be connected in a suitable Wheatstone bridge arrangement, or other measuring circuit for deriving an output electrical indication of an angular displacement of the spin axis 14—14 of rotor 13 with respect to the axis of housing 10. It is understood that any such displacement of the spin axis 14 with respect to the vertical axis of housing 10 will diminish the spacing between the rim portion 31 and certain of the pickup heads 40, and increase such spacing with respect to other of the pickup heads. The displacement pickup heads will provide an output electrical indication representative of such variation in spacing, and hence, indicate the magnitude and direction of displacement of the spin axis of rotor 13 with respect to the vertical axis of housing 10. Such electrical indication may then be used in any desired manner to correct for the displacement, or to provide such intelligence to a control system of which the gyro comprises a part.

A control circuit for use with the torquer coils 39 and the displacement signal developed by the displacement pickup heads 40 after initial alignment of the rotor and housing axis, is shown in FIGURE 11 of the drawings. This circuit includes a constant frequency oscillatory signal source 131 having its output connected to a bridge circuit 132 which includes the displacement pickup head 40 as one arm thereof in the manner illustrated. In the particular arrangement shown in FIGURE 11 of the drawings, the pickup head 40 is shown mounted adjacent to and on the same side of the annular rim portion 31 of rotor 13 as the torquer coil 39. This is in contrast to the physical arrangement illustrated in FIGURE 1 of the drawings wherein the torquer coil 39 and the displacement pickup coil 40 are shown mounted on opposite sides of the rim portion 41. The control circuit of FIGURE 11 may be applied to either arrangement, however, by the simple introduction of the 180 degrees phase displacement of the signal generated between displacement pickup coil 40, and any error correction signal supplied to the torquer coil 39. If it is possible, the arrangement shown in FIGURE 11 is preferred since phasing problems are thereby minimized. The displacement pickup coil 40 may comprise either an inductive or capacitive pickup head which is supplied with the high frequency oscillation from oscillator 131. The pickup head is included in the bridge circuit 132 which is initially balanced for zero output when the rotor spin axis is properly aligned with the housing axis. The signal developed by pickup head 40 and bridge circuit 132 is supplied through a carrier frequency amplifier 133 of conventional construction, and a demodulator and filter circuit 134 to an audio-frequency displacement amplifier 135. Because the two amplifier circuits and the demodulator and filter circuits operate at room temperature and are of conventional construction, it is believed unnecessary to described them in detail. To utilize the displacement signal developed by this circuit, the output of the displacement amplifier 135 is connected to supply the torquer coil 39, and to a suitable indicating circuit 137, or to a servo positioning system of which the gyro comprises a part. If desired, the leads connected to the torquer coil 39 may include a variable resistor 138 for adjusting the value of the current supplied to the torquer coil 39. It is to be understood that all of the portions of the control circuit with the exception of the torquer coil 39, and displacement pickup 40 are at normal room temperature, but that the torquer coil 39 is constructed from superconductive materials. Under certain conditions of operation it may be desirable to trap flux generated by the torquer coil so that it may be disconnected from the output of amplifier 135. For this purpose, a superconductive gate element 138 may be connected between the leads supplying the torquer coil 39, which gate element is surrounded by a superconductive field winding 139 having a higher critical magnetic field strength than does the gate element 138. Upon initially energizing the torquer coil 39 current is supplied to the field winding 139 from a source of control current 141 connected thereto. This control current is of sufficient magnitude to break down gate element 138 so that it is no longer superconductive thereby allowing current to be supplied to the torquer coil 39 from displacement amplifier 135. Upon the rotor 13 being properly positioned by the resulting magnetic pressure developed by torquer coil 39, this control current is cut off so that gate element 138 again becomes superconductive and maintains the correct supercurrent in coil 39. This feature allows all of the current developed by amplifier 135 thereafter to be supplied to indicating circuit 137.

In order to reduce the temperature of the gyroscope shown in FIGURE 1 to a temperature in the neighborhood of zero degrees Kelvin ($-273°$ F.), it is necessary that the gyro be mounted in a suitable insulating housing, and supplied with a coolant such as liquid helium in order to attain these required temperatures. Such a housing is illustrated in FIGURE 3 of the drawings and includes an outer container 143 formed of steel or other suitable material in which is disposed a layer of insulation such as glass fibre 144. Inside the layer of glass wool 144 is a second container wall 145 which defines an evacuated space 146 that may be evacuated through a line (not shown). The inner wall 145 may be mechanically supported by the glass fibre insulation 144 within outer container 143 and surrounds a third inner container 148 in which the liquid coolant such as liquid helium is disposed. In order than the inner container 148 be rigidly secured to the outer container 143, a plurality of thin diameter stay wires 149 are interconnected between the inner container 148 and the outer container 143 in a criss-cross up to down and down to up pattern whereby the inner container is rigidly secured to the outer container without providing any high conductivity interconnections between the two containers through which heat losses may occur. For a more specific disclosure of the construction of the insulating housing, reference is made to copending application S.N. 791,953, now U.S. Patent No. 3,004,683, General Electric Company Docket No. 14D-1558, Buchhold and Schoch, inventors, entitled "Insulating Housing" filed concurrently herewith, and assigned to the General Electric Company. The gyroscope housing 10 is rigidly secured to the inner container 148 since these two bodies operate in the same temperature region, and electrical leads supplying the various electrical operating parts of the gyroscope are run past suitable baffling and heat traps out a tubular conduit (not shown) through which the liquid coolant in inner container 148 is vented.

Prior to placing the gyroscope of FIGURE 1 in operation, all of the bearing coils and stator field windings are not energized, so that the rotor 13 is not floating but rests on the lower portion of outer housing 10. While in this condition, the coolant introduced into the inner container 148 lowers not only the temperature of housing 10 but also the temperature of rotor 13 as well as all of the component parts of each. After all such parts have reached the temperature necessary for superconductivity, the upper and lower vertical bearing coils 15 and 16, and the lateral stabilizing coils 17, 18, 21, 22, etc., are all energized to lift and float the rotor 13 to its normal operating position. Having thus floated rotor 13 within housing 10, the torquers 36 are then all energized by connecting them in parallel circuit relationship to a source of direct current through a suitable control rheostat. Upon being thus energized, the torquers will act as auxiliary bearings to roughly align the spin axis of rotor 13 with the vertical axis of housing 10. Having thus roughly aligned the spin axis of rotor 13, the stator field windings 35 are then energized so as to produce a rotating magnetic field acting on the indented portion 33 of armature ring 32 of the rotor to thereby cause rotor 13 to be rotated. Rotor 13 is then brought up to a desired speed in the manner described with relation to the speed control circuit shown in FIGURE 10 of the drawings, and thereafter maintained at this desired speed by reducing the power supplied to the stator field winding, or by cutting out such power entirely, and subsequently re-energizing the windings at periodic intervals to maintain the speed of revolution of the rotor within some predetermined limits. Having attained its desired speed, the spin axis of rotor 13 is then brought into exact alignment with housing 10 by the technique described with relation to FIGURE 11 of the drawings. Thereafter, any change in attitude or position of the outer housing 10 will cause a precession or displacement of the spin axis of rotor 13 with respect to the vertical axis passing through housing 10. This displacement will cause the displacement measuring circuit shown in FIGURE 11 to develop an output electrical signal representative of such displacement, which may then be used in any manner desired to indicate such change in attitude or position.

Figure 5:
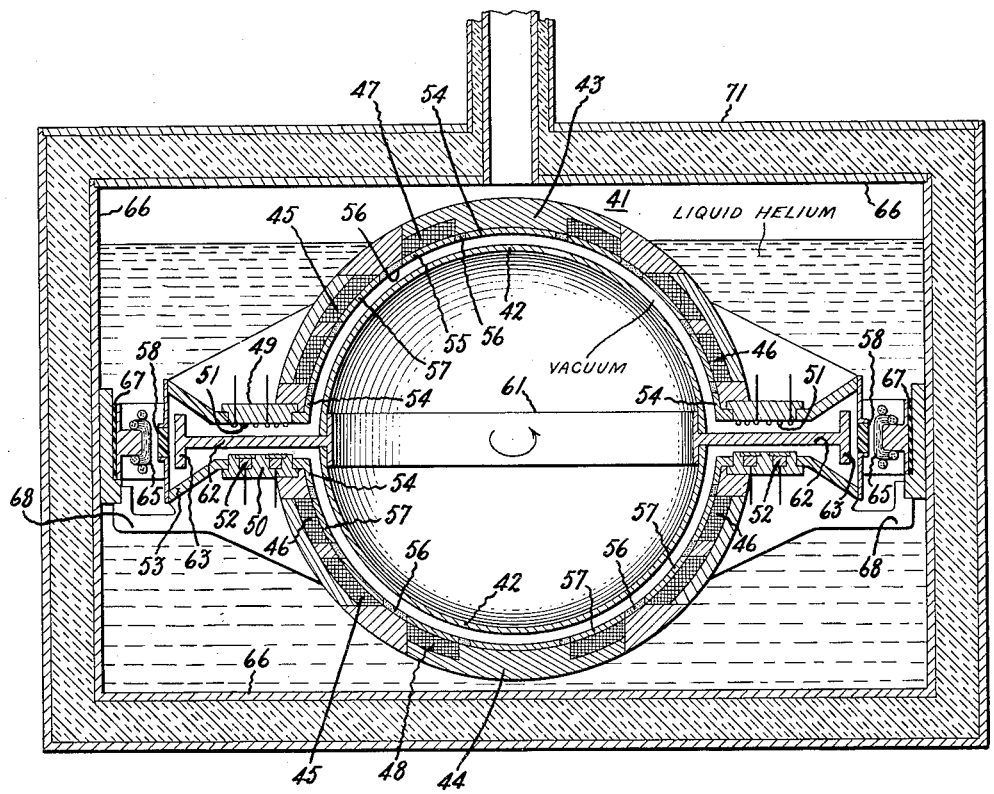
FIGURE 5 is a sectional view of a second embodiment of a gyroscope constructed in accordance with the teachings of the present invention.

A second embodiment of the superconductor gyro constructed in accordance with the present invention is shown in FIGURE 5 of the drawings. The embodiment of the invention shown in FIGURE 5 operates in a similar manner to that shown in FIGURES 1–3, but differs therefrom in its fabrication. The superconductor gyro shown in FIGURE 5 includes an outer housing member 41 which is spherical in shape, and is fabricated from two substantially identical hemispheres 43 and 44. Each of the hemispheres 43 and 44 is formed from a plurality of segments of a suitable ferromagnetic material such as iron, which are interlocked one with the other by welding. The interlocking segments out of which each of the hemispheres 43 and 44 are formed are designed to provide space to accommodate two sets of four lateral stabilizing bearing coils indicated at 45 and 46, and a pair of vertical stabilizing bearing coils 47 and 48. The lateral magnetic bearing coils 45 and 46 are all connected in parallel to a source of direct current through a control rheostat, and the vertical stabilizing coils 47 and 48 are similarly connected to a source of energizing current. All of the bearing coils 45, 46, etc., and 47, 48 are fabricated in the manner described with relation to the bearing coils 15, 16, 18, 19 etc., shown in the species of the invention of FIGURE 1, and hence will not again be described in detail. Each of the hemispheres 43 and 44 includes an annular rim portion 49 and 50 which oppose each other and which serve to support a magnetic torquer coil 52 and a displacement pickup coil 51. Secured between the rim portions 49 and 50 of the two hemispheres 43 and 44 is an outwardly flaring annular flange 53 which is sealed closed in a vacuum tight manner by a ceramic piece 58. To complete the outer housing 41, an inner surface fabricated from superconducting material is secured over the inner face of each of the hemispheres 43 and 44 by welding, brazing, or otherwise. This inner surface of superconducting material essentially comprises a plurality of segments of superconducting material cut to fit over the bearing coils as bearing plates, and interconnected by some non-superconducting material such as titanium. To be particular, the inner superconducting shield is formed from two basic hemispherically shaped shells 54 of superconductive material which is completed by superconductive bearing plate portions 55 that cover the vertical stabilizing magnetic bearing coils 47 and 48, and are isolated from the basic hemispherical superconducting shell 54 by titanium portions 56. Similarly each of the four lateral stabilizing magnetic bearing coils 45 and 46 in each of the hemispheres 43 and 44 are covered by similar superconducting bearing plates 57 which are connected to the basic superconductive shell structure 54 by titanium portions 56. The entire housing structure is fabricated to present an integral surface of superconductive portions and non-superconducting portions confronting rotor 42, and forms a vacuum-tight enclosure so that the space between the inner surface of the housing 41 and the rotor 42 may be evacuated through a suitable vent line (not shown). Superconductive lead wires for supplying electric current to the various electrically operating parts of the gyroscope are also supplied through the aforementioned vent opening.

The rotor 42 is formed from two hemispheres of superconducting material which are joined together over an annular band 61 by shrink fitting the hemispheres with an appropriate heat treating process. If desired, of course, the hemispheres comprising the rotor 42 may be brazed, welded, or otherwise secured to the band 61; however, by properly proportioning the dimension of the hemisphere, and the band 61, a shrink fitting process should adequately secure the hemispheres together. The rotor 42 may also have vent openings therein for equalizing the pressure between the interior of rotor 42 and the space between housing 41. The annular band 61 of rotor 42 has an integral rim portion 62 which is adapted to extend out between the rim portions 49 and 50 of the outer housing 41, and which has an upstanding armature ring 63 secured around its periphery. The armature ring 63 is designed to have indented portions formed therein, similar to the indented portions 33 shown in the FIGURE 1 species of the invention to provide a surface against which a magnetic driving field can act to cause the armature ring 63, and hence rotor 42, to be rotated about a spin axis extending vertically through the center of the rotor 42 as illustrated in FIGURE 4.

In order to drive the armature ring 63, a stator field winding 65 is provided around the outside circumference of the ceramic closure plate 58, and is secured in this position by an annular coil mount fastened to the inside surface of a container 66 in which the housing 41 is mounted. The stator field winding 65 is identical in construction to the stator field windings 35 shown in the FIGURE 1 species of the drawings, and hence will not again be described in detail. Stator field winding 65 is magnetically isolated from the inner container 66 by a suitable magnetic shield of superconducting material 67 interposed between the coil mount and the inner container 66. The rotor housing 41 is secured in a position so that the armature 63 confronts the stator field winding 65 by a supporting jaw 68 which is secured to the outer housing 41 of the gyro and to the inner wall of the container 66. The inner container 66 is adapted to contain a refrigerant, preferably liquid helium, for reducing the temperature of the outer housing 41, rotor 42 and other component parts thereof to 4.2 degrees Kelvin or thereabouts, which is the desired operating temperature range of the superconductive gyro shown in FIGURE 4. The gyro housing is completed by enclosing the inner container 66 in a suitable vacuum-tight enclosure formed by an outer container wall 71, which is further supported within an insulating housing (not shown) including glass wool or other insulating materials. Container 66 may be supported within this outer housing by a fine wire supporting structure similar to that described in the above identified copending application of Buchhold and Schoch.

In operation, the species of the invention shown in FIGURE 5 of the drawings functions in a manner entirely similar to that of the species of the invention shown in FIGURE 1, and accordingly will not be described in detail. About the only significant difference in the mode of operation is in the fact that the armature ring 63 is enclosed in an evacuated space separated from the stator field windings 65 so that while the armature ring 63 is included in an evacuated space to reduce windage losses, the stator field winding 65 is exposed to the cooling fluid. It is believed that this construction will greatly reduce the possibility of raising the temperature of any of the parts of the gyro above their critical temperature with its consequent breakdown of the gyro, is greatly reduced. In all other respects, the gyro shown in FIGURE 5 will operate in a manner similar to the gyro of FIGURE 1.

Figure 6:
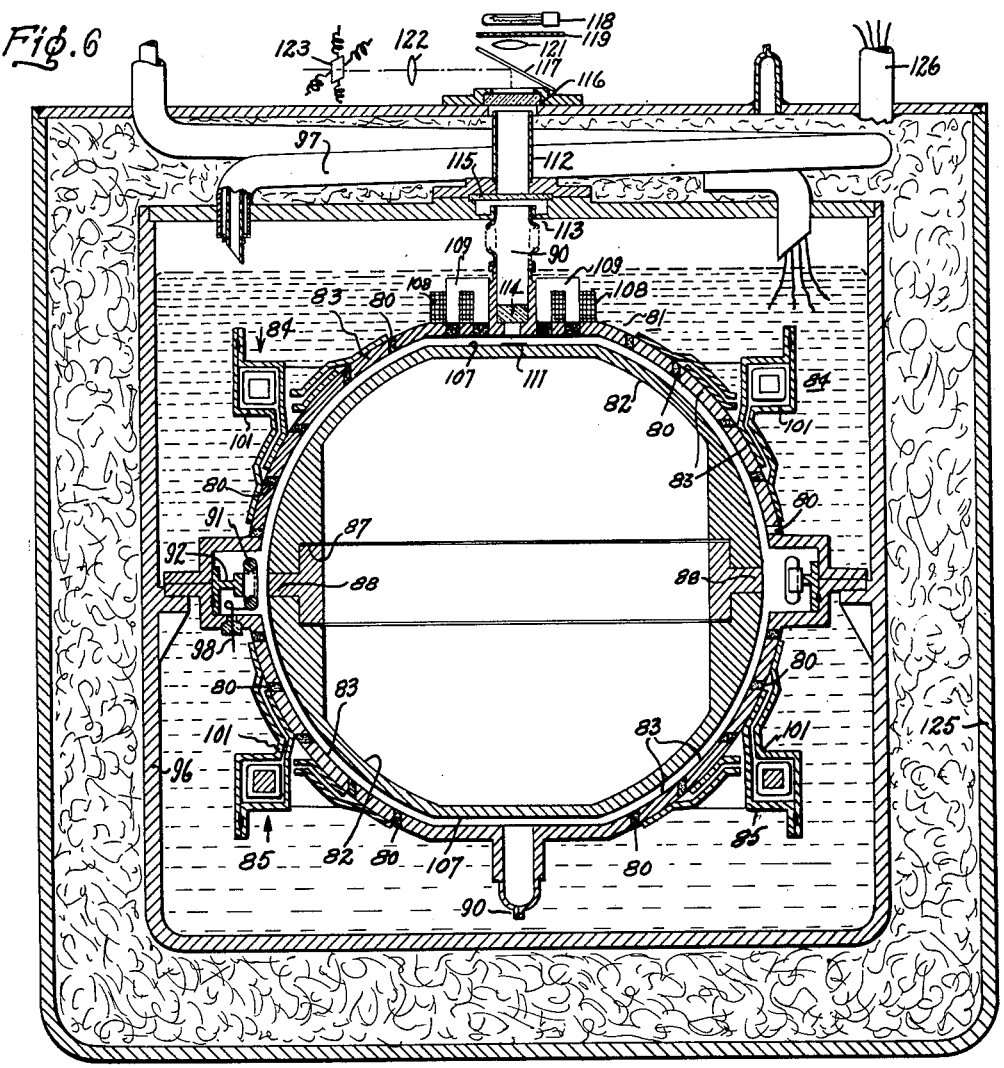
FIGURE 6 is a sectional view of still a third gyroscope constructed in accordance with the invention.
Figure 7:
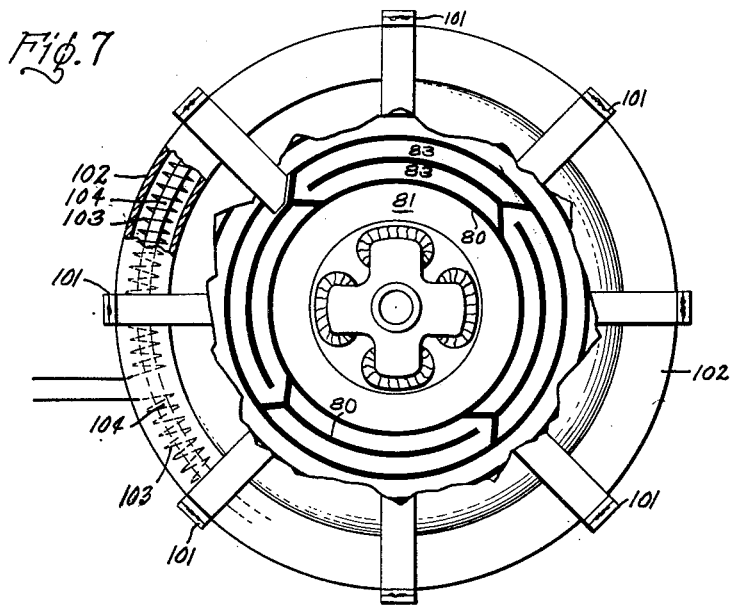
FIGURE 7 is a plan view of a partially broken away current transformer comprising a part of the gyro shown in FIGURE 6.

Still another embodiment of a superconductive gyroscope constructed in accordance with the teachings of the present invention is shown in FIGURE 6 of the drawings. This gyroscope includes a generally spherical outer housing 81 in which an inner rotor member 82 is rotatably supported by magnetic bearings. The magnetic bearings are formed directly into the outer housing 81 by cutting a pattern of slots 80 into a pair of hemispheres formed from about 1/20 inch thick superconducting material which are joined together to produce the spherical housing 81. The slots 80 are fitted with a magnetic non-superconducting material such as iron, and results in a continuous smooth surface having a plurality of segments of superconducting material 83 which are in a superconducting sense electrically isolated from one another. Each of these superconducting segments 83 is shaped in the form of a single turn current loop having a configuration such as that illustrated in FIGURE 7. In order to energize the superconductive segments 83 of outer housing 81, each of the segments is connected through a large strip like superconductor to a single turn superconducting secondary winding of a current transformer 84 which supplies the upper hemisphere of housing 81, or to a single turn superconducting secondary winding of a current transformer 85 which supplies the lower hemisphere of outer housing 81. These connecting straps are welded to form a superconducting connection to segments 83 at the points 86 shown in FIGURE 7 of the drawings so that the single turn secondary windings of the current transformers 84 and 85 and the segments 83 in fact constitute closed current loops. These single turn closed current loops when energized by a current of large magnitude in the order of several hundred amperes will develop a substantial magnetic field that is sufficiently strong to magnetically support the rotor 82 within the housing 81. Adjustments to this magnetic bearing field may be made by properly adjusting the value of the current supplied to the primary windings of the current transformers 84 or 85.

Figure 8:
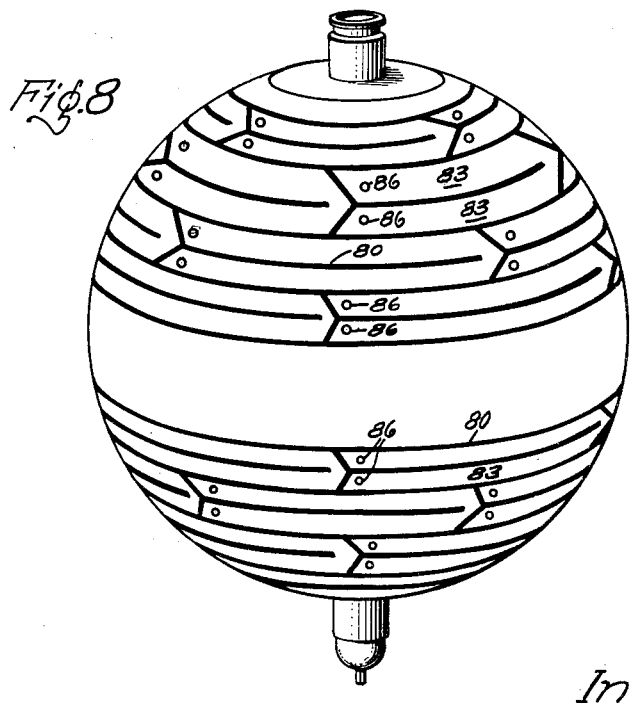
FIGURE 8 is a perspective view of the rotor of the gyro of FIGURE 6.

The rotor 82 is fabricated from a superconducting material, and preferably comprises a pair of hemispherically shaped hollow members press-fit over a banding ring 87. The two hemispherically shaped members comprising rotor 82 may be shrunk-fit over the annular band 87 by a suitable heat treating process, or secured thereto by some other means such as diffusion welding. The annular band 87 has an outwardly extending radial ring portion 88 thereon which, as best shown in FIGURE 8 of the drawings, has a plurality of saw-tooth shaped step portions or serrations 89 formed therein. The serrations or sawtooth shaped step portions 89 extend completely around the circumference of the rim portion 88. Rotor 82 is adapted to rotate freely about a spin axis 90, extending vertically through the rotor as shown in FIGURE 6, and is caused to rotate about this spin axis by the coaction of a single phase magnetic field with the saw-tooth shaped steps or serrations 89 formed in the edge of the rim portion 88.

In order to develop the single phase magnetic field by means of which the rotor 82 is caused to rotate, a stator field winding 91 is provided. The stator field winding 91, as best shown in FIGURE 8 of the drawings, comprises a single phase field winding formed from approximately 50 turns of 10 mil diameter formex coated niobium wire wound in conventional saddle fashion on a coil mount 92 shown in FIGURE 6 of the drawings. The manner in which the stator field windings 91 are secured on the coil mount 92 is similar to that described with relation to the species of the invention shown in FIGURE 1, and will not be described again in detail. The single phase stator field winding 91 illustrated does not extend continuously around the entire circumference of the rotor in confronting relation with the serrated rim portion 89, but instead is wound in two parts each located at diametrically opposite points and extends over only approximately a quadrant of the rotor circumferences. However, if desired the field winding 91 could be made to extend completely around the circumference of armature 88. To assure that rotor 82 will start rotating upon the stator field winding 91 being energized, a starting pawl coil 93 is provided in confronting relation with respect to the serrated edge of rim portion 88, and is located approximately midway between the sets of stator field windings 91, as best shown in FIGURE 8 of the drawings. Also, in order to develop a pickup control signal for controlling the frequency of rotation of the rotor as well as indicating its speed, a pickup coil 94 is provided in confronting relation with the serrations 89, and may be located approximately diametrically opposite the starting pawl coil 93. Both the starting pawl coil 93 and the pickup coil 94 are fabricated in substantially the same manner as the stator field windings 91, however, comprise only a single coil in place of several coils forming the stator field windings.

The coil mounts 92 on which the stator field windings 91 are supported is secured to an annular trough surrounding the equator portion of housing 81 and formed by joining two adjacent annular offset flanges in the two hemispheres out of which the outer housing 81 is fabricated. This annular trough is then secured by any suitable mounting means of pedestals to the inner surface of an inner container 96 in which the housing 81 and rotor 82 is physically located. This container 96 serves to hold the liquid refrigerant, preferably liquid helium, which reduces the temperature of housing 81 and rotor 82 down to 4.2 degrees Kelvin or lower, the temperature range at which the gyro shown in FIGURE 6 is designed to operate. The liquid refrigerant is supplied to the inside of container 96 through a coaxial conduit 97 that extends through the top of the container 96, and surrounded by an outer evacuated space for insulation purposes. The conduit 126 preferably has a number of heat traps formed therein in the form of baffles to prevent any direct heat radiation on the gyro structure, and in the portions of the supply connections thereto preferably includes one or two nitrogen heat traps. It is also desirable that the electrical leads to the current transformers 84 and 85 (not shown) and to the stator field winding 91, shown at 98 extending through an insulating bushing in the trough portion of the lower hemisphere of housing 81, extend through the central conduit of vent pipe 126 past the baffling and heat traps therein in a manner conventional in low temperature work.

The details of construction of the current transformers 84 and 85 are shown in FIGURE 9 of the drawings wherein the upper hemisphere of the outer housing is shown at 81 and a number of the single turn coils formed by the superconductive segments 83 may be seen. The single turn coils formed by the segments 83 are connected directly to large conductive single turn superconductive straps 101 which in fact constitute the single turn secondary windings of the transformers. The superconductive straps 101 surround a circular coaxial insulating shield 102 formed in two parts of superconducting material which surrounds the primary winding 103 that surround a magnetic core member 104 of iron. The multiturn primary winding 103 of transformer 84 is series connected with the corresponding multiturn primary winding 103 of the current transformer 85 supplying the lower hemisphere of outer housing 81. The lead wires to the multiturn primary winding 103 may be supplied through the inner conduit of vent pipe 126. The multiturn primary winding 103 is formed from approximately 3000 turns of 5 mil diameter formex coated niobium wire closely wound around iron core 104. The coaxial shield 102 surrounding the primary winding 103 and core 104 is made in two interlocking halves and protects the primary windings from flux fields built up by the secondary winding. This shield is necessary because of the nature of the superconducting secondary windings which have a current induced therein which is large enough to produce a flux equal and opposite to the flux produced therethrough by the primary winding. To keep this secondary flux from interlocking the primary winding 103, shield 102 is provided. The shield 102 is formed of two half do-nut shaped members (the half do-nuts being formed by cutting through the plane of the do-nut) which have the free ends telescoped over each to form a completely enclosing shield, but which are electrically insulated one from the other. The single turn secondary winding 101 is formed from straps of superconducting material about ⅛ inch wide. By reason of this construction, it is possible to supply a very large magnetizing current to the single turn segments 83 on the outer housing 81 without risking possible heat leakage as would be the case if such large currents were supplied through conductors led down through the vent pipe 126 into the interior of container 96. Because the current transformer 85 is substantially identical in construction to the current transformer 84, only the current transformer 84 has been described in detail.

Because it is not possible to correctly adjust the current supplied to the single turn segments 83 on outer housing 81 to properly float rotor 82 with its spin axis 90 in alignment with the vertical axis of housing 81, it is necessary to provide a means for adjusting the rotor 82 to provide such alignment. For this purpose, rotor 82 includes a flattened portion, indicated at 107, centrally disposed about and normal to its spin axis 90 on both the lower and upper hemispheres comprising the rotor. This flattened surface is of course superconducting since the hollow sphere which comprises the rotor 83 is formed of superconducting material, and is adapted to be acted upon by a magnetic field produced by four torquer coils 108 secured to the top of the upper hemisphere of outer housing 81. The four torquer coils 108 are spaced 90 degrees apart about a circumference that is normal to the vertical housing 81. Each of the torquer coils 108 is formed from about 300 turns of 5 mil diameter formex coated niobium wire surrounding a horseshoe shaped magnetic core member 109 of iron that extends down through the outer housing member 81 so that its ends abut the flattened surface 107 of rotor 82. By this construction current flowing in the torquing coils 108 develops a magnetic flux in the horseshoe core members 109 which acts against the flattened portion 107 of rotor 82 to cause it to be tilted with respect to the vertical axis of housing 81.

In addition to serving as a surface against which the torquing coils 108 may act, the flattened surface 107 of rotor 82 also serves another purpose. The flattened surface 107 has a highly polished portion 111 which is disposed under an optical light column. This light column passes through a tubular member 112 whose longitudinal axis is aligned with the vertical axis of housing 81, and which has an accordion-type bellows connection 113 to a similar tubular member in the top of the housing 81. Disposed in the upper and lower tubular members 112 are light filters 114, 115 and 116 for filtering infrared, and other heat transmitting portions of the light spectrum out of light transmitted through column 112 onto the surface 111. The light column 112 is aligned with a half-silvered mirror 117 which is illuminated from a light source 118 through a suitable aperture 119 and objective lens arrangement 121. The light thus focussed is transmitted through half-silvered mirror 117 down through the three filters 114, 115, and 116 in the light column 112, and onto the highly polished surface 111 of rotor 82. This light is then reflected back up through the light column against the half-silvered mirror 117 where it is reflected to a lens 122, and focussed upon a semiconductor photocell 123. The semiconductor photocell 123 is of the type which develops an output electric signal representative of the quadrant on which light impinges upon it. Accordingly, the electric signal developed by the photocell 123 can be used to indicate the magnitude and direction of any displacement of the surface 111 from a position normal to the vertical axis of housing 81, and hence is a measure of the displacement of spin axis 90 of rotor 82 from its aligned vertical position with respect to the vertical axis of housing 81. It has been determined that with an optical arrangement of this type, an output signal can be derived which is indicative of a minimum displacement angle of a second of an arc or better and a maximum displacement angle of approximately 1 degree of arc. It is to be understood that the portions of the optical displacement measuring arrangement which include half-silvered mirror 117, light source 118, and photocell 123 are all located outside of the region in which the gyro is located, and hence are at normal room temperature.

In order to conserve upon the coolant supplied to the interior of the container 96, this container may be supported within an evacuated space formed by a second container 125 surrounding container 96, and capable of being evacuated to a low vacuum through a tubulation 127. It is anticipated that the structure thus comprised would then be supported with a glass wool insulated housing by a fine wire supporting structure similar to that described in the above identified copending application of Buchhold and Schoch.

Prior to placing the superconducting gyro of FIGURE 6 in operation, the outer surface of the gyro housing 81 is flooded with a cryogenic fluid such as liquid helium that is introduced into the container 96 through the fluid conduit 97. The space between the container 96 and container 125 is evacuated to assure minimum consumption of the cryogenic fluid. Upon the gyro structure reaching its operating temperature in the neighborhood of zero degrees Kelvin depending upon the materials out of which the gyro is fabricated, current is supplied to the current transformers 84 and 85. Current flowing in the primary windings 103 of the current transformer develops a current in secondary straps 101 which is supplied to the superconductive segments 83. The superconductive shield 102 serves to protect the flux developed by the secondary winding turns 103 from directly cutting the primary turns 101. Current flow induced in the single turn secondary windings 101 and the single turn coils formed by the segments 83 in the surface of the outer housing 81 then produce a magnetic bearing field which acts against the rotor 82 to support it entirely free from any direct mechanical contact with any other part of the gyro assembly. The principle by which this action occurs is believed to have been explained clearly with respect to previous species of the invention, and hence will not be again described in detail. Having once properly floated the rotor within the housing 81, it is next necessary to energize the torquer coils 108 so that the spin axis 90 of rotor 82 is roughly aligned with the vertical axis of the housing 81. Upon this occurrence, it is then possible to energize the stator windings 91 to cause the rotor 82 to be rotated.

The manner in which the torquers 108 act against the flattened surface 107 of rotor 82 through magnetic pressure to cause it to line up the spin axis of rotor 82 with the vertical axis of the housing 81 can be determined from an examination of FIGURE 6. The magnetic flux produced by the torquer coils 108 threads down through the horseshoe core members 109 and develops a pressure force against the superconductive flattened surface 107 in the same manner that the magnetic bearing coils act against the rotor to support it. By controlling which ones of the torquer coils 108 are energized, and the magnitude of the currents supplied thereto, it is possible to use the pressure developed by the torquer coils 108 to correct the misalignment of the rotor spin axis. In starting initially with the rotor at rest it would be necessary to employ a starting circuit which serves to connect all the torquer coils 108 in parallel to a source of electric current. When thus energized, the torquer coils 108 act as auxiliary bearing coils to maintain rotor 82 in rough alignment while it is brought up to speed.

Having roughly aligned the rotor 82 in the above manner the stator field winding 91 may then be energized to cause the rotor to rotate. Upon the stator windings 91 being energized, a magnetic turning force will be built up that acts normal to the flat surfaces of the serrations 89 in the edge of armature ring 88. This normal turning force acts as a moment arm to produce a torque on the rotor to turn it in a clockwise direction as shown in FIGURE 8 of the drawings. In order to bring the rotor up to the desired speed, a variable frequency supply is used which is controlled with a control signal developed by the pickup coil 94.

Pickup coil 94 is supplied from a high frequency signal source 145 of the speed control circuit shown in FIGURE 12 of the drawings through a bridge circuit 146 of which the pickup coil 94 comprises one arm. As a consequence of this arrangement, as the rotor, and hence armature ring 88 rotates, the gap between the pickup coil 94 and the serrations 89 in the edge of the armature ring is modulated at a frequency determined by the speed of the rotor. This speed modulated signal is amplified in a carrier frequency amplifier 147, rectified in a detector and filter circuit 148 where the carrier frequency is filtered out and supplied to a speed frequency amplifier 149. Amplifier 149 has its output connected back across the stator winding 91 in order to synchronize the excitation of this winding with the speed of rotor 82, and also has its output connected to a comparison circuit 151. Comparison circuit 151 also has supplied thereto a reference frequency signal developed by a reference oscillator 152 which is set to the desired speed of rotation of rotor 82. The comparison circuit compares the frequency of the two signals supplied thereto, and derives an output signal representative of their difference which is supplied to amplifier 149 as a control bias. By this arrangement, upon the rotor 82 attaining its desired speed, the magnitude of the excitation current supplied to stator windings 91 is reduced to a value sufficient only to overcome windage losses, etc. In place of the control circuit shown in FIGURE 12, it may be desirable to utilize a control circuit employing a variable time rate source of direct current pulses to energize the single phase stator windings. Because any such control circuit would be roughly similar to the circuit of FIGURE 12 it was not deemed desirable to illustrate such a circuit. Also, all of the elements of the control circuit of FIGURE 11 operate at room temperature, they are of conventional construction and their circuit details have not been illustrated. It might also be noted that the signal produced by the pickup coil 94 can be used to determine the rotor speed. In order to assure that the stator windings 91 will produce a normal force acting on the serration 89 that will produce a starting torque to assure rotor 82 starting, a positioning coil 93 is provided which will serve to shift the rotor to a position such that the force produced by the stator coils will act normal to the surface of the serrations 89, and hence produce a turning torque.

Having once brought the rotor 82 up to speed, any deviation of the spin axis of the rotor from alignment with the vertical axis of the housing may be detected by the optical detection system as previously described. The optical detection system works by passing a beam of light down upon highly reflective surface 111 on the rotor 82 which causes the beam of light to be reflected back up onto a semiconductor photocell. The reflected beam of light produces a difference voltage across the electrodes of the semiconductor photocell 123 whose magnitude and polarity may be readily calibrated in terms of shift of the rotor about axes normal to the vertical axis of housing 81 and normal to each other. As previously mentioned, the optical detection system is believed capable of detecting minimum detection angles as low as 500th of a second of arc, and would be capable of detecting a maximum deflection angle of two degrees of arc. The resulting error current developed by photocell 123 may then be supplied to a control table or other servo positioning system as required to correct for the deviation or may be used in any other manner for the information contained therein as to the change in position, attitude, etc., which caused the displacement. The displacement measuring circuit of FIGURE 12 may also be used in conjunction with a torquer control circuit similar to FIGURE 11 to correct for misalignment of the rotor spin axis with the axis of housing 82 after the rotor 81 is brought up to speed. Such an arrangement might employ the signal derived by photocell 123 directly (after amplification); however, it is more probable that additional torque control signal deriving circuits would be used in conjunction with the torquers with these additional circuits being controlled at least in part by the signal derived from photocell 123.

Having described several embodiments of a gyroscope constructed in accordance with the present invention, it is believed obvious, that many modifications and variations of the present invention are possible in the light of the above teachings. It is therefore to be understood that changes may be made in the particular embodiments of the invention described which are within the full intended scope of the invention as defined by the appended claims.

What I claim as new and desire to secure by Letters Patent of the United States is:

1. A superconductive gyroscope comprised of a housing, a superconductive rotor formed of superconducting material within the housing and rotatable about a spin axis, superconductive magnetic pressure bearings formed of superconducting material for suspending the rotor completely out of mechanical contact with the housing, superconductive magnetic driving means formed of superconducting material for rotating the rotor about its spin axis, pickoff means supported by the housing for detecting variation of the rotor spin axis, torque generating means for varying the rotor spin axis, and cooling means for lowering the temperature of the mechanism to enable such superconductive rotor, bearings, and driving means to achieve superconductive condition.

2. The combination set forth in claim 1 further characterized by an evacuated space between the rotor and housing to lessen windage friction on the rotor.

3. In a superconductive gyroscope, a fluid tight housing, a symmetrically shaped rotor member movably supported within the housing to rotate about a spin axis, the space between the housing and the rotor being evacuated to lessen gas friction that might impede speed of rotation of the rotor within the housing, magnetic means supported by the housing for maintaining the rotor completely out of physical contact with the housing, means providing a rotating magnetic field to spin said rotor, the portions of the rotor and housing in the vicinity of said magnetic means and rotating magnetic field being formed with at least a thin outer layer of superconductive material whereby no electrical heating losses may be generated therein, pickoff means for detecting variation of said spin axis from a given reference, torque supplying means operable to vary said rotor spin axis, means for lowering and maintaining the temperature of said housing and rotor to a point sufficient for said superconductive materials to reach a superconductive condition, and means including said rotating magnetic field producing means for progressively raising the rotative speed of said rotor from a standstill until a given desired speed is reached.

4. In a gyroscope the combination comprised of a housing and rotor together with magnetic suspending means for supporting the rotor within the housing about its spin axis; and magnetic stator field winding drive means for turning the rotor, pickoff means for detecting deviation of the spin axis, and torque means for varying the spin axis; the improvement including the provision of at least a thin outer layer of material that can be rendered superconductive by placing the material in a superconducting temperature environment, the material covering the rotor member and magnetic winding drive means, and the provision of at least a thin layer of material that can be rendered superconductive by placing the material in a superconducting temperature environment, the material covering portions of the magnetic suspending means to focus the magnetic flux generated thereby in a symmetrical pattern about the rotor and thereby stably float the rotor within the housing.

5. In a magnetic gyroscope capable of stably operating in the temperature range of absolute zero, a housing, a rotor formed of superconductive material within the housing, magnetic bearings formed of superconductive material for stably floating the rotor within the housing, superconductive magnetic stator field windings formed of superconducting material supported by the housing for producing a rotating magnetic pressure force for turning the rotor about its spin axis, displacement measuring means for detecting variations in the spin axis of the rotor, and means for cooling said gyro to bring said superconductive materials and members to a superconductive condition.

6. The combination set forth in claim 5 further characterized by means connected to said magnetic bearing means for capturing the circulating currents induced therein and allowing said bearing means to be disconnected from external energy sources.

7. A gyroscope comprising a housing, a rotor formed of superconductive material supported within the housing to rotate about a spin axis, superconductive bearing means formed of superconducting material secured within said housing for floatingly supporting said rotor within said housing for rotation about its spin axis free of any mechanical connection to the housing, superconducting magnetic stator field windings formed of superconducting material surrounding said rotor for acting on the same with magnetic pressure forces to cause the rotor to rotate, and means for lowering the temperature of said superconductive rotor, bearing and stator field windings to achieve a superconductive condition.

8. The combination set forth in claim 7 further characterized by displacement pickoff means supported by the housing for detecting variations in the position of the rotor spin axis.

9. The combination set forth in claim 7 further characterized by torque generating means for varying the position of the rotor spin axis relative to an axis of said housing.

10. The combination set forth in claim 7 further characterized by an evacuated space between the rotor and housing to lessen windage friction on the rotor.

11. The combination set forth in claim 7 further characterized by displacement pickoff means supported on the housing for deriving an electric signal indication of any variation in position of the rotor spin axis relative to an axis of the housing, magnetic torque generating means for varying the position of the rotor spin axis relative to an axis of the housing, and control circuit means coupled to said pickoff means and to said magnetic torque generating means for utilizing the signal developed by said pickoff means to control the operation of said torque generating means to align the spin axis of said rotor with an axis of the housing.

12. The combination set forth in claim 7 further characterized by electric signal generating pickoff means supported by the housing for detecting variations in the position of the rotor spin axis relative to an axis of the housing, magnetic torque generating means including a superconductive coil for varying the position of the rotor spin axis relative to the axis of the housing, and control circuit means for utilizing the electric signal developed by said pickoff means for controlling the operation of said magnetic torque generating means to align the spin axis of said rotor with an axis of the housing, said control circuit means including a superconductive gate element for trapping flux generated by said torque generating superconductive coil upon reaching a condition of alignment.

13. A gyroscope comprising a housing shaped from superconductive material and having a pattern of slots formed therein filled with a non-superconductive material to divide the inner surface of the housing into a plurality of superconductive segments shaped in the form of a loop, a rotor of superconductive material supported within the housing for rotation about a spin axis, a current transformer having a large primary to secondary turns ratio, and having single turn secondary windings connected to said superconductive segments of said housing to form closed current loops, said closed current loops forming magnetic bearing means for floatingly supporting said rotor with said housing completely out of mechanical contact with the housing, said current transformer being fabricated from superconducting materials, superconductive magnetic stator field windings surrounding said rotor for acting on the same with magnetic pressure forces to cause the rotor to rotate, and means for lowering the temperature of said superconductive housing, current transformer, rotor, and stator field windings to achieve a superconductive condition.

14. The combination set forth in claim 12 further characterized by displacement pickoff means supported by the housing for detecting variations in the position of the rotor spin axis.

15. The combination set forth in claim 12 further characterized by torque generating means for varying the position of the rotor spin axis relative to an axis of said housing.

16. The combination set forth in claim 12 further characterized by an evacuated space between the rotor and housing to lessen windage friction on the rotor.

17. The combination set forth in claim 12 further characterized by displacement pickoff means supported on the housing for deriving an electric signal indicative of any variation in position of the rotor spin axis relative to an axis of the housing, magnetic torque generating means for varying the position of the rotor spin axis relative to an axis of the housing, and control circuit means coupled to said pickoff means and to said magnetic torque generating means for utilizing the signal developed by said pickoff means to control the operation of said torque generating means to align the spin axis of said rotor with an axis of the housing.

18. The combination set forth in claim 12 further characterized by electric signal generating pickoff means supported by the housing for detecting variations in the position of the rotor spin axis relative to an axis of the housing, magnetic torque generating means including a superconductive coil for varying the position of the rotor spin axis relative to the axis of the housing, and control circuit means for utilizing the electric signal developed by said pickoff means for controlling the operation of said magnetic torque generating means to align the spin axis of said rotor with an axis of the housing, said control circuit means including a superconductive gate element for trapping flux generated by said torque generating superconductive coil upon reaching a condition of alignment.

References Cited in the file of this patent
UNITED STATES PATENTS

| | | |
|---|---|---|
| 2,442,274 | Mallett | May 25, 1948 |
| 2,443,842 | Tama | June 22, 1948 |
| 2,562,690 | Becker | July 31, 1951 |
| 2,804,776 | Summers | Sept. 3, 1957 |
| 2,871,703 | Walker | Feb. 3, 1959 |